United States Patent [19]

Kimura

[11] Patent Number: 4,886,955
[45] Date of Patent: Dec. 12, 1989

[54] HEATING APPARATUS FOR MAINTAINING A SOLUTION AT A PREDETERMINED TEMPERATURE

[75] Inventor: Shinichi Kimura, Yamatokoriyama, Japan

[73] Assignee: Sharp Kabushiki Kaisha, Osaka, Japan

[21] Appl. No.: 167,730

[22] Filed: Mar. 14, 1988

[30] Foreign Application Priority Data

Jun. 9, 1987 [JP] Japan .............................. 62-89124[U]
Jun. 10, 1987 [JP] Japan .............................. 62-89740[U]

[51] Int. Cl.⁴ .............................................. H05B 1/02
[52] U.S. Cl. .................................... 219/494; 219/505; 219/508; 219/510; 219/518; 219/519; 219/493; 219/308; 219/327; 99/281
[58] Field of Search .............. 219/323, 327, 308, 490, 219/492, 493, 494, 497, 501, 507–509, 510, 519, 518, 506; 99/281, 283, 329 R, 282, 325

[56] References Cited

U.S. PATENT DOCUMENTS

| | | | |
|---|---|---|---|
| 3,385,957 | 5/1958 | Munson et al. | 219/501 |
| 3,681,569 | 8/1972 | Schwarz | 219/492 |
| 4,029,940 | 6/1977 | Eaton, Jr. et al. | 219/506 |
| 4,085,309 | 4/1978 | Godel et al. | 219/501 |
| 4,158,759 | 6/1979 | Mason | 219/506 |
| 4,330,702 | 5/1982 | Cheng | 219/493 |
| 4,334,146 | 6/1982 | Sturm | 219/492 |
| 4,350,876 | 9/1982 | Kubota et al. | 219/519 |
| 4,725,714 | 2/1988 | Naya et al. | 219/493 |
| 4,733,054 | 3/1988 | Paul | 219/518 |

Primary Examiner—M. H. Paschall
Attorney, Agent, or Firm—Birch, Stewart, Kolasch, & Birch

[57] ABSTRACT

A heating apparatus including a heating member for heating a subject, a temperature detector for detecting a temperature of the subject an energizing control element that is electrically connected to the temperature detector so that current conduction to the heating member at a the time when the temperature detector is actuated to operate after the subject to be heated and a switch element for disconnecting the temperature detector to the energizing control element in response to the actuation of the energizing control element. The heating apparatus is appropriate for use in a vacuum coffee maker.

3 Claims, 5 Drawing Sheets

HEATING APPARATUS FOR MAINTAINING A SOLUTION AT A PREDETERMINED TEMPERATURE

BACKGROUND OF THE INVENTION

The embodiments of the present invention relate to a heating apparatus for use in a vacuum coffee maker, an electric pot capable of boiling water, and so on.

Conventionally, a vacuum coffee maker that uses an alcohol lamp as a heating source for heating a flask has been widely known. A problem in such a vacuum coffee maker is that a difficult operation is required and therefore the coffee maker is inconvenient.

However, prior to the present invention a vacuum coffee maker has been considered which was arranged so that the extraction of coffee essence could be automatically terminated in order to improve the operation of the vacuum coffee maker. FIG. 6 shows an electric circuit of a heating apparatus used in such a vacuum coffee maker.

In FIG. 6, the circuit includes an AC source 51, a main switch 52, a water heater 53 for heating a flask, a heat-retaining heater 54 for the flask, a thermal switch 55 of an automatic reset type which turns on/off in response to a change of temperature at the bottom of the flask, a power-on indicating lamp 56, and an over-temperature preventing device 57. If the main switch 52 is turned on, then the water in the flask is heated by the water heater 53 and the heat-retaining heater 54 so that the water in the flask becomes hot. The hot water is forced up into a funnel by the pressure rising inside the flask so that the flask is heated when no water is contained therein. In this condition, the thermal switch 55 turns off so that the current conduction to the water heater 53 is cut off and the operation mode is changed from the water heating operation to the heat retaining operation. Thereafter, when the temperature decreases inside the flask to thereby lower the inside pressure, the coffee solution in the funnel is drawn back into the flask. The temperature of the coffee solution contained in the flask does not decrease rapidly by heat from the heat-retaining heater 54. The temperature of the coffee solution slowly decreases before finally reaching about 80°–85° C. at which point the coffee solution is subject to a heat-retaining process.

Such a circuit arrangement, however, has various problems in practical use which will be described as follows. For example, in the case when a large volume of coffee is made, it is necessary to successively use the vacuum coffee maker several times because a large volume of coffee making can not be made at one time. In this case, if the on-reset temperature of the thermal switch 55 is set to a low value, the vacuum coffee maker cannot be used for a long period of time before the thermal switch 55 turns on. In contrast the on-reset temperature of the thermal switch 55 is set to a high value, the thermal switch 55 may turn on to carry out the water heating operation again when the funnel is left as it is after making coffee with the funnel fitted in the flask.

SUMMARY OF THE INVENTION

It is therefore an object of the embodiments of present invention to provide a heating apparatus in which a subject to be heated which has been previously boiled can be subject to a heat-retaining process without boiling the subject again.

In order to attain the above object, the embodiments of the present invention provide a heating apparatus which includes a heating member for heating a subject a temperature detector for detecting a temperature of the subject to be heated, an energizing control that is electrically connected to the temperature detector to control current conduction to the heating member of time when the temperature detector is actuated to operate after heating of the subject is started, and a switch for cutting off connection of the temperature detector to the energizing controller in response to actuation of the energizing controller.

Preferably, the energizing controller includes a first relay and a series circuit provided in a rectifier element and a thermosensitive element which is connected in series to the heating. The switch includes a second relay with the first relay being arranged to supply AC directly to the heating member when the heating period is started to actuate the temperature detector so that AC is supplied to the series circuit and therby supply DC to the heating member after actuation of the temperature detector. The second relay is arranged to be actuated for cutting off the electrical connection of the temperature detector with the series circuit by the first relay.

Preferably, the first relay includes a make contact, a break contact, and a coil. The second relay includes a break contact and a coil. The make contact of the first relay is connected in series to the heating member, the break contact of the first relay is connected to the heating member through the series circuit, the coil of the first relay is connected to the temperature detector through the break contact of the second relay and the coil of the second relay is connected to the break contact of the first relay.

Each of the first and second relays may be a solid-state relay.

Preferably, the temperature detector is an automatic reset thermal switch or a thermal reed switch. Alternatively, the temperature detector may include a plurality of thermosensitive elements which have different operating temperatures from each other, and a change-over switch for switching current conduction to the thermosensitive elements.

DETAILED DESCRIPTION OF THE PREFERRED EMBODIMENTS

Figure 1:
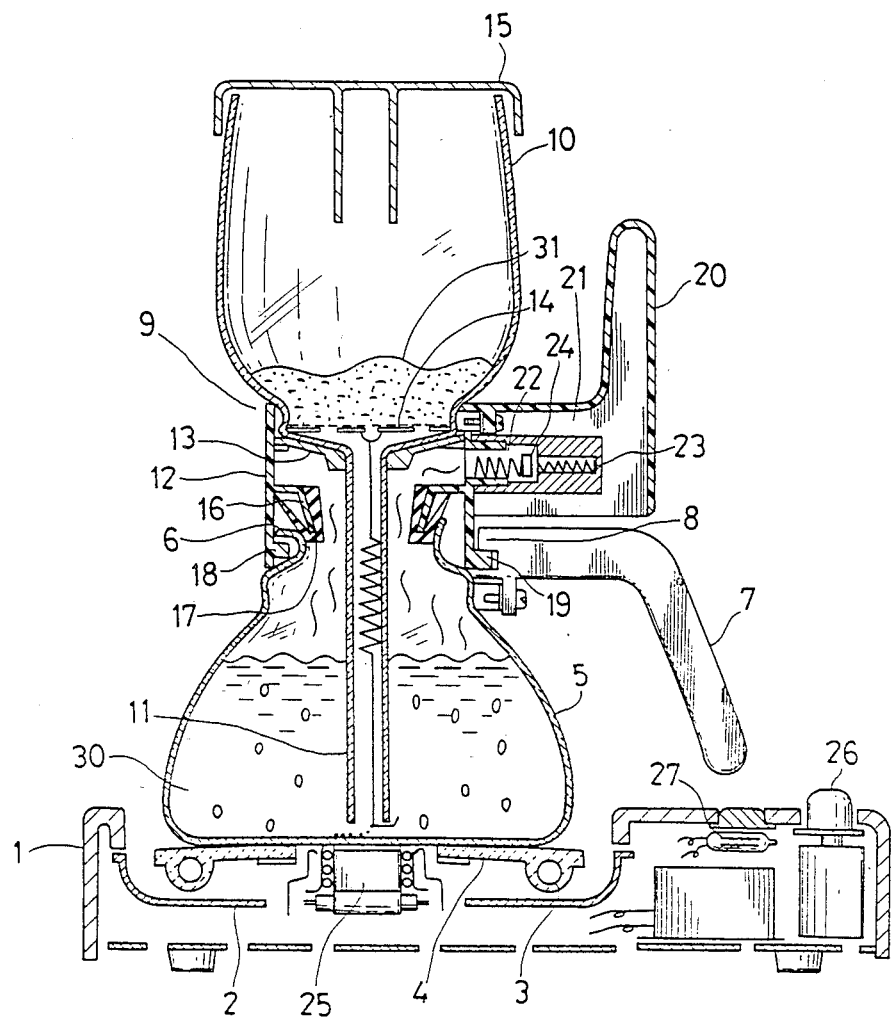
FIG. 1 is a longitudinal sectional view showing an arrangement of a vacuum coffee maker including an embodiment of the heating apparatus according for the present invention.
Figure 2:
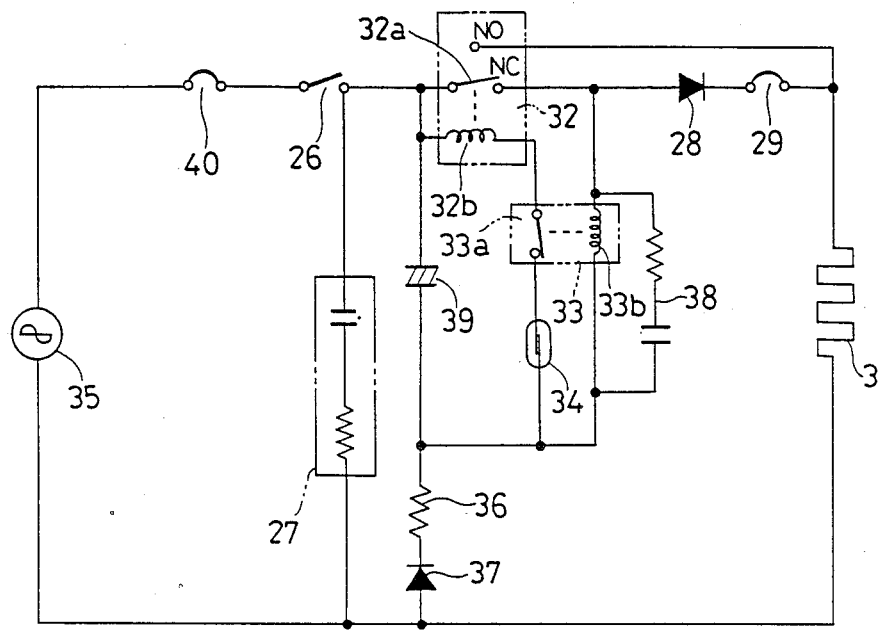
FIG. 2 is a block diagram of an electric circuit of the embodiment of the heating apparatus according for the present invention.
Figure 3:
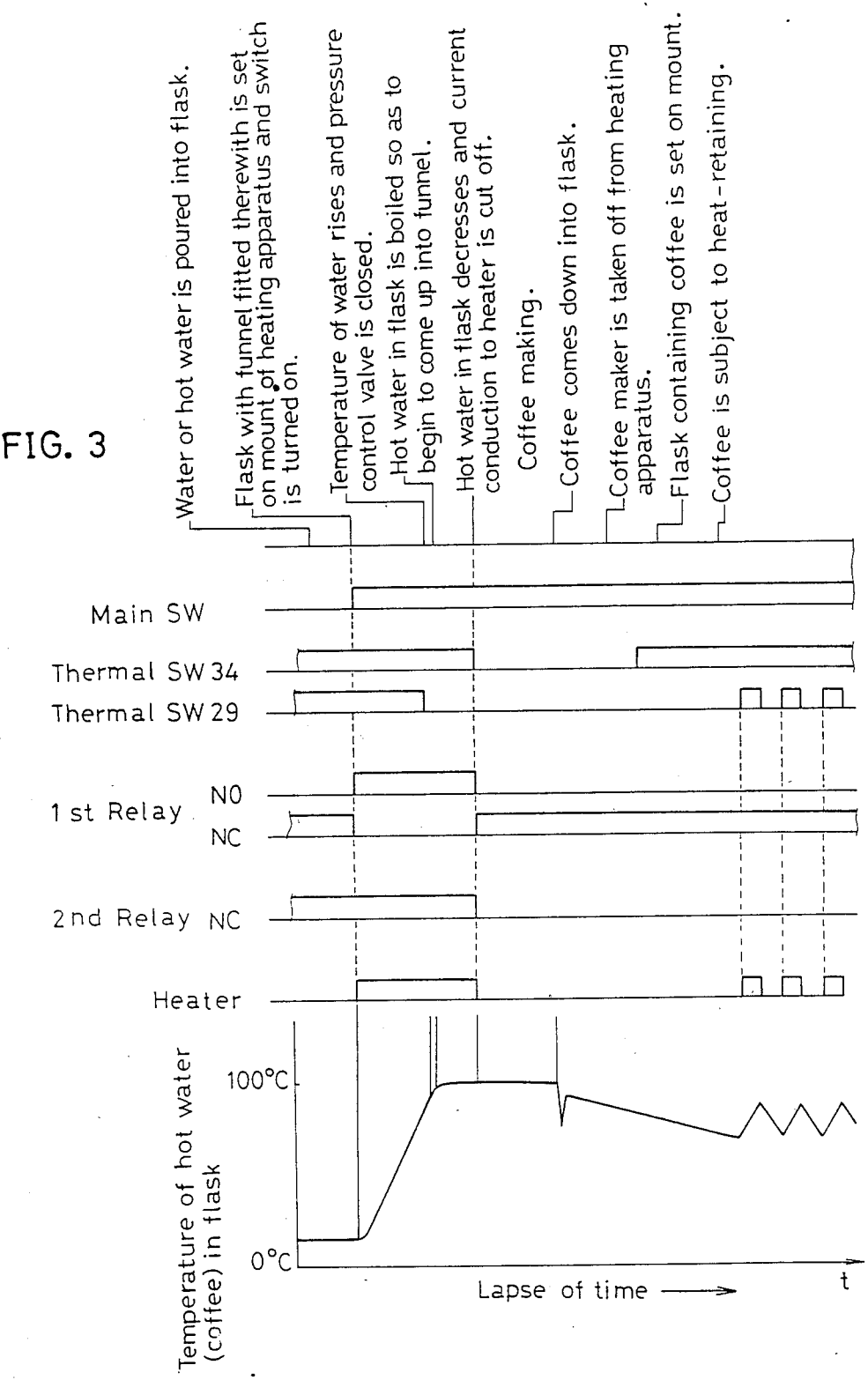
FIG. 3 is a diagram for illustrating the operation of the embodiment.

A vacuum coffee maker for an embodiment of the present invention is shown in FIG. 1 through FIG. 3 and will be described in detail.

Referring now to FIG. 1, a heating apparatus 1 is fitted with a shield 2 inside thereof, and a heating plate 4 having a heater 3 that is integrally incorporated is disposed on the shield 2. A first container (flask) 5 has a pouring opening 6 on an appropriate part of the upper opening as well as providing a handle 7 of a synthetic resin at the opposite side of the pouring opening 6. A second engagement socket 8 among a pair of engagement sockets that is provided on the flask 5 is formed at the fixed end of the handle 7, and a first engagement socket is used in combination with the pouring opening 6 of the flask 5.

A second container (funnel) 9 includes a container (funnel) body 10 which is made of glass a vertical pipe 11 that extends to the lower part of the bottom of the container and a container support (annular member) 12 of synthetic resin and that is integrally fixed on the outer periphery of the funnel body 10 with a gasket 13 interposed therebetween. The funnel body 10 whose inner bottom is removably fitted with a filter 14 may receive coffee powder on the filter 14, and the upper opening of the funnel body may be closed by a cover 15. The funnel support 12 integrally forms a cylinder 16 which is located at an adequate space on the outer periphery of a pipe 11 inside the funnel support 12 and the cylinder 16 is fitted with a gasket 17. Also, at the lower end of the funnel support 12, integrally forms at the lower an engagement projection 18 is integrally formed as a first convex portion which faces inside and an engagement projection 19 formed as a second convex portion which faces outside. Thereby an engagement support is made with each of the engagement sockets and engagement projections.

As shown in FIG. 1, by turning around the funnel when press-fitting and compressing the gasket 17 against the opening of the flask 5, the funnel 9 engages an engagement projection 18 beneath the pouring opening 6 and an engagement projection 19 with an engagement socket 8, respectively. Each engagement may be retained by the elasticity of the gasket 17 and the juncture between the flask 5 and the funnel 9 may be securely sealed.

The funnel support 12 described above integrally forms a handle 20 at a position so that the handle 20 faces the handle 7 on the flask 5 and provides a control valve 21 at a position that is covered by the handle 20 therefore. The control valve 21 includes shape-memory alloy 2, a spring 23, and a valve body 24, which opens the inside of the flask 5 and exposes air in the open state at the normal temperature, and then closes the flasks when an ambient temperature inside the flask 5 reaches a specified temperature.

In FIG. 1, reference numeral 25 denotes a heat sensing device that is used for sensing temperatures at the bottom of the flask 5. Reference numeral 26 denotes a main switch, and reference numeral 27 denotes a power indication lamp that is used for sensing temperatures.

FIG. 2 shows an electric circuit for the heating apparatus 1. The circuit is provided with a first relay 32 of a transfer type, a second relay 33 of a break contact type, a thermal switch 34 of an automatic reset type for which the heat sensing device 25 is incorporated, and an AC source 35.

The first relay 32 is provided with a relay switch 32a and a coil 32b, and the second relay 33 is provided with a relay switch 33a and a coil 33b. The relay switch 32a of the first relay 32 has a movable arm connected to one terminal of the AC source 35 through the main switch 26. A break contact NC is connected to the other terminal of the AC source 35 through a heat-retaining control circuit, which includes by a diode 28 and a heat-retaining thermal switch 29, and the heater 3. A make contact NO is also connected to the other terminal of the AC source 25 through the heater 3. The coil 32b of the first relay 32 is connected at one end to one terminal of the AC source 35 through the main switch 26 and is connected at its the other end to the other terminal of the AC source 35 through a series connection of a break contact of the relay switch 33a of the second relay 33, the thermal switch 34, a resistor 36, and a diode 37. The coil 33b of the second relay 33 is connected at one end to the break contact NC of the first relay 32 and is connected at its the other end to the junction between the thermal switch 34 and the resistor 36. A CR delay circuit 38 is connected in parallel to the coil 33b. A capacitor 39 is connected in parallel to the series connection of the coil 32b, the relay switch 33a, and the thermal switch 34. An over-temperature preventing device 40 is inserted between the main switch 26 and one terminal of the AC source 35.

In the thus arranged this circuit, and energizing controller includes the first relay 32 and the series connection of the diode 28 and the thermal switch 29. A switch includes second relay 33. A temperature detector includes the automatic reset thermal switch 34.

In the foregoing circuit, the first and second relays 32 and 33 are arranged to be driven by DC. They are driven by a DC supply because, if the first and second relays 32 and 33 are driven by an AC supply it is difficult to make the first and second relays 32 and 33 are difficult to timely operate so that the possibility of causing a chattering phenomenon ocurring in the first relay 32 is likely. Further, the CR delay circuit 38 is provided to delay the operation of the second relay 33 by about ten msec to stabilize the operation thereof.

Referring to FIG. 3, the operation of the heating apparatus 1 will be described as follows. The temperature change shown in FIG. 3 is not the change detected by the thermal switch but the change of the hot water temperature in the flask.

The funnel 9 that contains coffee powder 31 is coupled with the flask 5 containing water 30, and the flask 5 is mounted on the heating plate 4. Then, if the main switch 26 is turned on, because the thermal switch 34 and the relay switch 33a are both in the on-state, the coil 32b is energized to change the relay switch 32a from the break contact NC to the make contact NO. Thereby, cause a full wave current will flow to the heater 3. The water 30 in the flask 5 is heated by the heater 3 so that the temperature of the water 30 begins to rise. Then, steam will be generated when the water temperature sufficiently rises. At this time, however, the pressure control valve 21 of the flask 5 is in an opened state so that inside of the flask 5 is exposed with air and the pressure in the flask 5 does not rise immediately as a result. Then, the temperature of the hot water in the flask 5 rises close to the boiling point so that steam is generated extensively generated. When the ambient temperature in the flask 5 has reached a predetermined value the pressure control valve 21 is closed. If the pressure control valve 21 is closed, the inside of the flask 5 becomes airtight and the inside pressure rises rapidly and forces the boiling water into the funnel through the pipe 11 and the filter 14 to thereby make the boiling water contact with the coffee powder 31. Thus, the taste and aroma of the coffee powder 31 are effectively extracted into the boiling water.

If the boiling water within the flask 5 decrease and the temperature of the boiling water remaining has reached a predetermined value that cause the thermal switch 34 to turn off, then the current supply to the coil 32b is stopped and the relay switch 32a is changed from the make contact NO to the break contact NC. Thereby, the heat-retaining control circuit is in series with the heater 3. At this time, however, the thermal switch 29 is the off-state and the current conduction to the heater 3 is stopped. On the other hand, the second relay 33 turns the relay switch 33a turn off later than the break contact NC of the first relay 32 is turned on by about ten msec as a result of the CR delay circuit 38.

After the heating operation by the heater 3 is stopped, the temperature in the flask 5 begins to fall so that the pressure in the flask 5 becomes a negative pressure, and the coffee solution in the funnel 9 is drawn into the flask 5 through the filter 14 and the pipe 11.

After the extraction of coffee essence, the flask 5 and the funnel 9 are rotated relative to each other by grasping the handles 7 and 20 which releases the engagement between the engagement projection 18 and the pouring opening 6 and the engagement between the engagement projection 19 and the second engagement socket 8. As a result it is possible to draw the funnel 9 out of the flask 5 and to pour the coffee solution into a coffee cup or the like from the flask 5. The temperature of the remainder of the coffee in the flask 5 can be maintained at 80°–85° C. by the on-off operation of the thermal switch 29 as long as the flask 5 is mounted on the heating plate 4.

In the case when the coffee is not taken immediately after the extraction of coffee essence and the flask 5 is left with the funnel 9 fitted therein, the temperature at the bottom of the flask 5 decreases and the thermal switch 34 is reset into the on-state when the temperature has reached a predetermined value which reset the thermal switch 34. At this time, however, the relay switch 33a is in the off-state and no current is supplied to the coil 32b of the first relay 32. Thereby, the relay switch 32a maintains a break contact NC in the on-state so that water heating operation by a full wave current from the heater 3 can not be performed. If the temperature in the flask 5 decreases further, the current conduction to the heater 3 is controlled by the on-off operation of the thermal switch 29 and the half-wave current conduction by the diode 28 so that the temperature of the coffee solution in the flask 5 is maintained at 80°–85° C. At that time, the heat-retaining control is performed so that coffee solution in the flask 5 is not forced into the funnel 9, because the pressure control valve 21 is in the closed state.

The vacuum coffee maker as described above is convenient because it may be successively used when the on-reset temperature of the thermal switch is set on at a higher temperature, and a further extraction of coffee does not occur if the funnel is left in a fitted position in the flask after the extraction. Therefore, the coffee maker is of a practical value.

Figure 4:
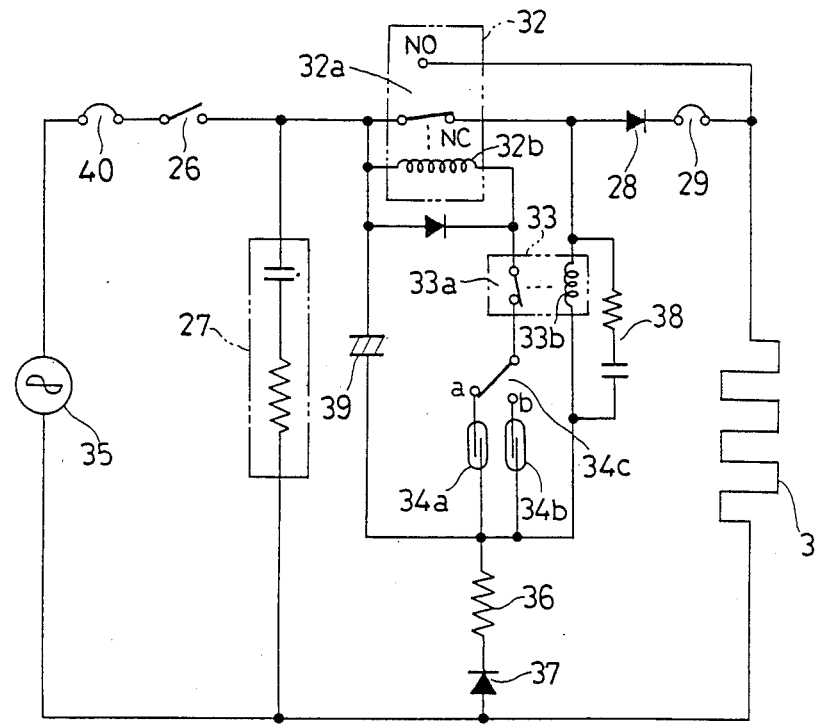
FIG. 4 is a block diagram of an electric circuit of a second embodiment of the heating apparatus according to the present invention.
Figure 6:
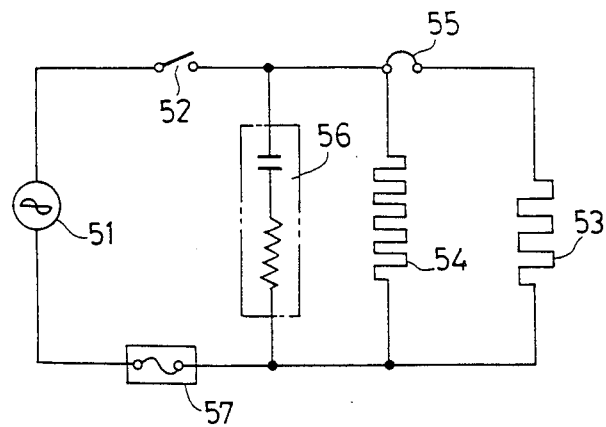
FIG. 6 is a block diagram of a prior art electric circuit art.

FIG. 4 is an electric circuit diagram of a second embodiment of the heating apparatus according to the present invention.

The second embodiment is different from the first embodiment only in the construction of the switch means. That is, in the second embodiment, the switch means includes automatic reset thermal switches 34a and 34b which have different operating temperatures from each other and are not incorporated in the heat sensing device 25, and a changeover switch 34c for changing the connection of the relay switch 33a of the second relay 33 between the thermal switches 34a and 34b. In the vacuum coffee maker, the changeover switch functions to change the density of coffee to be extracted.

Since the respective operating temperatures $T_1$ and $T_2$ of the thermal switches 34a and 34b are different from each other, a time lag $t_1$ occurs from a point of time at which the thermal switch 34a turns off to a point of time at which the thermal switch 34b turns off. For example, in the case when the power consumption of the heater 3 is selected to be about 550 watt and the difference between the respective operating temperatures $T_1$ and $T_2$ of the thermal switches 34a and 34b is set to 3° C., the above time lag $t_1$ is about 30 sec and the thermal switch 34b turns off about 30 sec after the thermal switch 34a is turned off.

Figure 5:
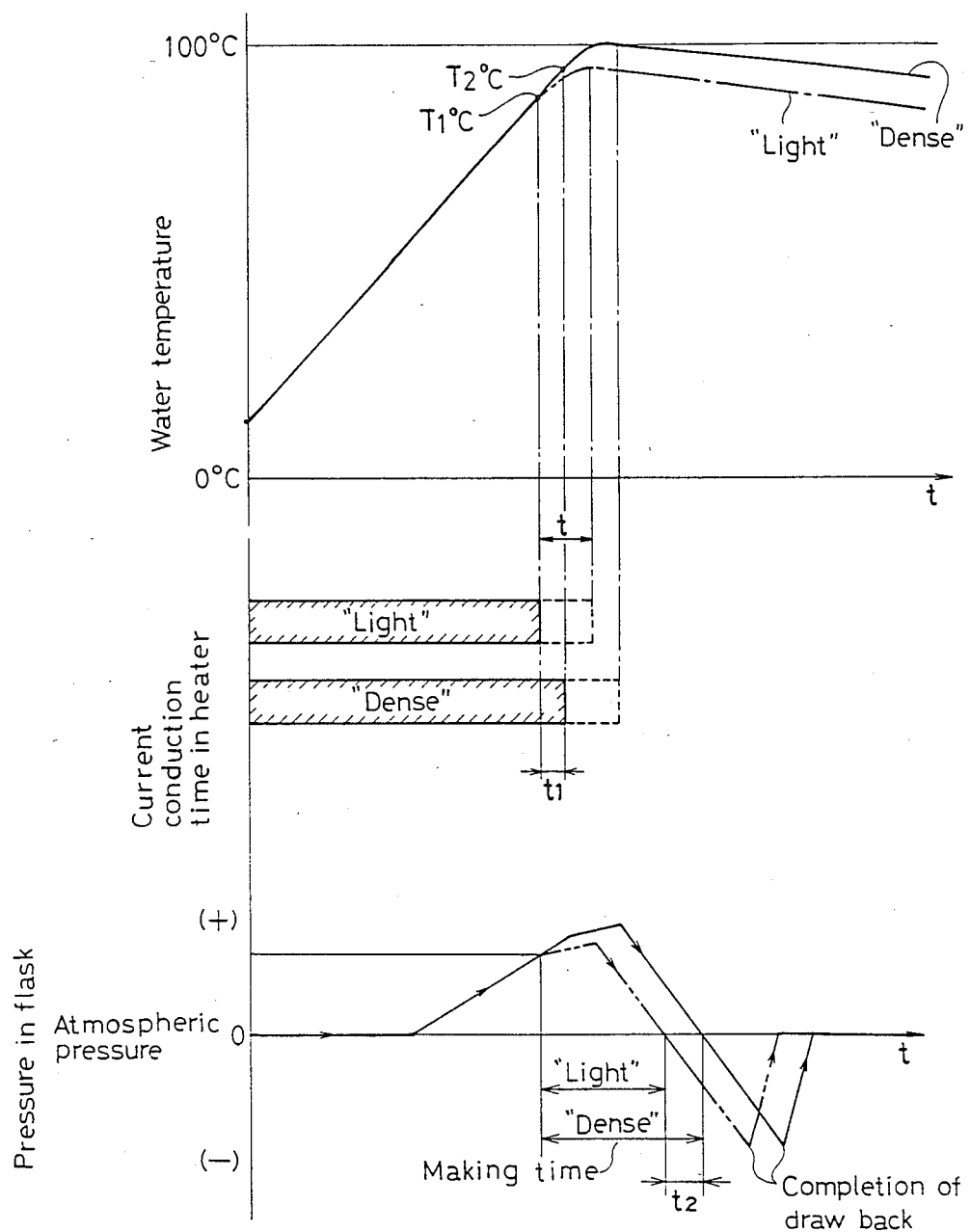
FIG. 5 is a diagram for explaining the operation of the second embodiment.

Referring to FIG. 5 in addition to FIG. 4, the operation of the second embodiment will be described hereunder. The process after the turn-on of the main switch 26 which actuates of the thermal switch 34a (34b) is similar to the process in the first embodiment, and the description for the process will be omitted.

When the changeoever switch 34c is switched to the a contact side, the current conduction to the coil 32b is cut off by the thermal switch 34a turning off so that the relay switch 34a is switched from the make contact NO to the break contact NC and the heat-retaining control circuit becomes in series with the heater 3. At the time, the heating by the heater 3 is stopped because the thermal switch 29 is in off-state, the heat capacity of the heating plate 4 becomes large so that the temperature is kept at the same temperature as the heating mode for about t sec. After this of t sec, the temperature inside the flask 5 begins to decrease, and when the pressure inside the flask 5 becomes a negative pressure, the coffee solution in the funnel 9 is drawn back into the flask 5 through the filter 14 and the pipe 11 which completes the extraction of the coffee essence.

On the other hand, when changeover switch 34c is switched to the b contact side, since the thermal switch 34b turns off later than the thermal switch 34a turns-off by a time lag of $t_1$ sec, the period of time after the hot water in the flask 5 has been forced into the funnel 9 until the coffee solution is returns into the flask 5 the time of the extraction of coffee essences is prolonged by about $t_2$ sec ($\approx t_1$ sec). Therefore, the obtained coffee solution becomes more dense in comparison to the case when the thermal switch 34a is used.

In the second embodiment, as described above, light coffee is possible to be obtained when the changeoever switch 34c is switched to the a contact side. Also dense coffee is possible to be obtained when the changeover switch 34c is switched to the b contact side.

If the number of thermosensitive elements that are used in the circuit is increased, the density of the coffee can be adjusted more precisely.

As described above, in the vacuum coffee maker of the second embodiment, the coffee making operation can be automatically terminated in order to improve the operation characteristics as well as improving the convenience for practical use and the density of the coffee can be suitably adjusted by choice. Thereby, the apparatus of the second embodiment provides a superior practical use.

Although a relay with contacts is used as each of the first and second relays in each of the above embodiments, the invention is not limited to the use of relays with contacts because solid state relays may be used. Although the embodiments of the present invention have been fully described by way of example to the accompanying drawings, it is to be noted here that various changes and modifications will be apparent to those skilled in the art. Therefore, unless such changes and modifications depart from the scope of the present invention, they should be construed as being included therein.

What is claimed is:

1. A heating apparatus for applying heat to a container, comprising:

heating means for detecting the presence of the container and applying heat to the container when the container is detected to be present;

temperature detecting means for detecting a temperature of the container;

energizing control means, electrically connected to said temperature detecting means for permitting heat to be applied by said heating means until said temperature is detected to exceed a predetermined value, said energizing control means comprising a first relay and a series circuit connected in series to said heating means, said first relay supplying AC directly to said heating means when the container is detected to be present and said series circuit supplying DC to said heating means after said temperature is detected to be below said predetermined value; and switch means for disconnecting said energizing control means from said heating means in response to said temperature exceeding said predetermined value and controlling said heating means for maintaining said temperature of the container within a predetermined temperature range below said predetermined value, said switch means comprising a second relay for disconnecting said series circuit from said heating means by said first relay.

2. A heating apparatus according to claim 1, wherein said first relay comprises a make contact, a first break contact, and a first coil, and said first relay being connected in series to said heating means, said first break contact of said first relay being connected to said heating means through said series circuit, said first coil of said first relay being connected to said temperature detecting means through said second break contact of said second relay, and said second coil of said second relay being connected to said first break contact of said first relay.

3. A heating apparatus according to claim 2, wherein said first and second relays comprise solid-state relays.

* * * * *